April 2, 1963 A. D. FOSTER 3,083,978
CART HAVING A REMOVABLE LOAD CARRIER
Original Filed Oct. 14, 1959
2 Sheets-Sheet 1
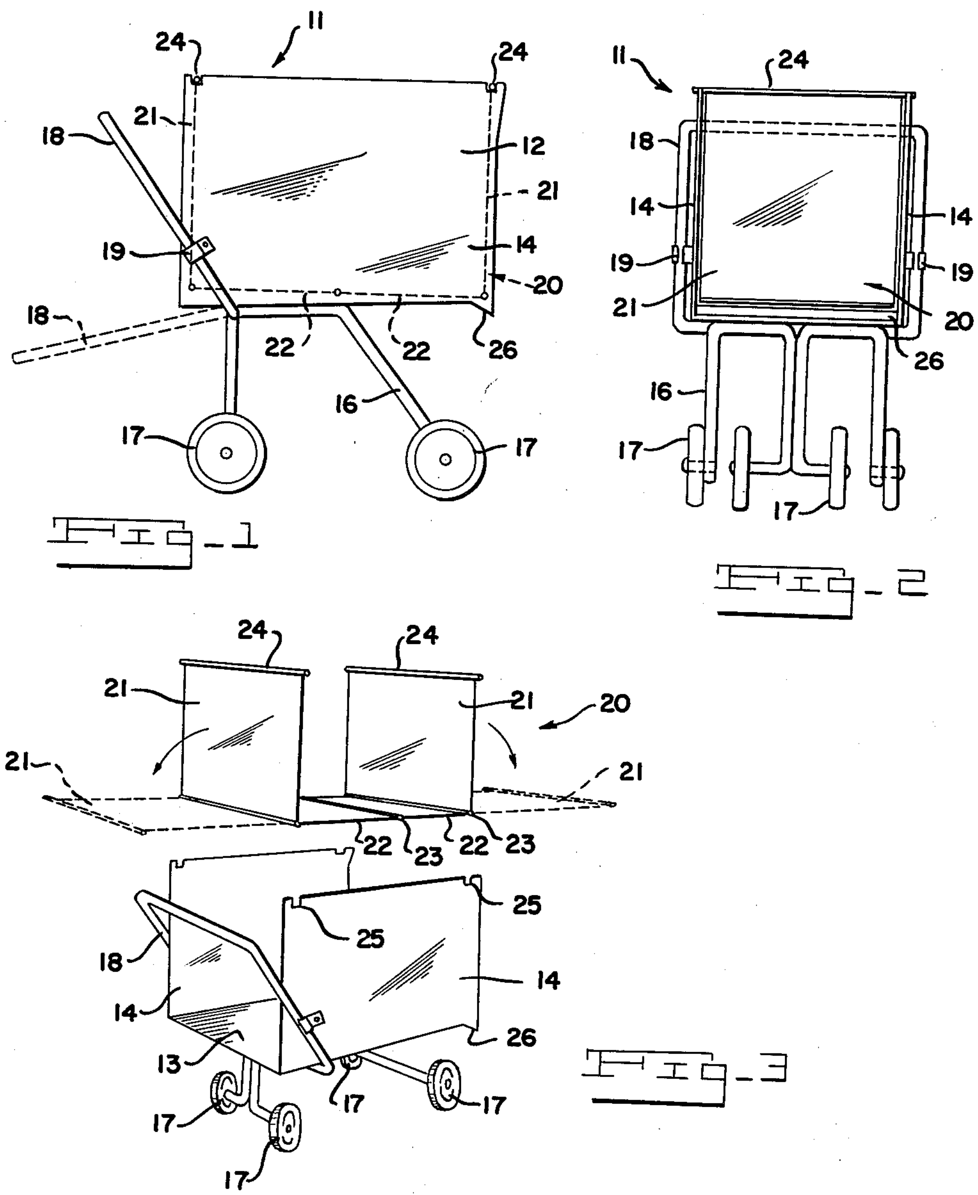
INVENTOR.
ALLAN D. FOSTER
BY Cullen & Cantor
ATTORNEYS

*INVENTOR.*
ALLAN D. FOSTER
*BY* Cullen & Cantor
ATTORNEYS

United States Patent Office 3,083,978

Patented Apr. 2, 1963

1

2

3,083,978

CART HAVING A REMOVABLE LOAD CARRIER

Allan D. Foster, Grosse Pointe, Mich., assignor to Almor Corporation, Detroit, Mich.

Original application Oct. 14, 1959, Ser. No. 846,399, now Patent No. 2,980,212, dated Apr. 18, 1961. Divided and this application Dec. 19, 1960, Ser. No. 76,826
6 Claims. (Cl. 280—47.34)

This invention relates to a cart for use with self-unloading checkout counter and is a division of my copending application, Serial Number 846,399, filed October 14, 1959 and since issued as Patent No. 2,980,212.

In the supermarket industry, it is common for the shopper to select her own merchandise, place it into a wheeled shopping cart, and bring the cart to the checkout counter. There the merchandise is checked, the customer pays her bill, and the merchandise is placed into bags for the customer to remove from the store. With each of these counters now in use, some person must manually remove the merchandise or groceries from the shopping cart and place them on the counter. That person may be the shopper or the check-out girl or an attendant.

One object of this invention is to provide a cart which can be automatically unloaded by the checkout counter.

A further object of this invention is to form a shopping cart which is formed with a removable pallet which supports the merchandise in the cart, forms the bottom and end walls of the cart, and may be automatically lifted out of the cart by the checkout counter to then serve as a means for carrying the merchandise to the checker, thus reducing wear on the counter conveyor, distributing the load of the merchandise upon the counter, and permitting unloading of the merchandise from the cart automatically rather than manually.

These and other objects and advantages of this invention will become apparent upon reading the following description of which the attached drawings form a part.

In these drawings:

FIG. 1 is a side elevational view of the shopping cart.

FIG. 2 is a front end view of the cart.

FIG. 3 is a perspective view of the shopping cart with its pallet removed and above it.

Figure 4:
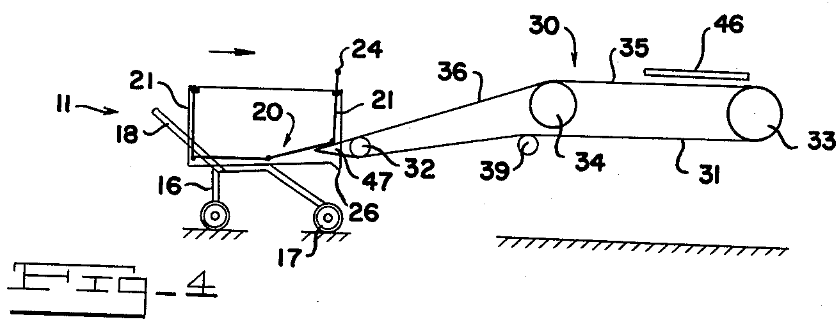
Figure 5:
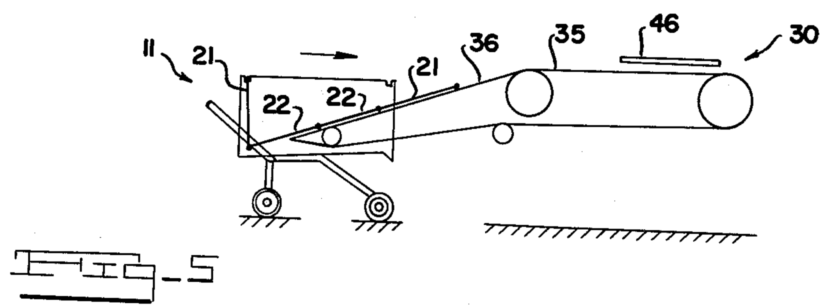

FIGS. 4, 5, 6, and 7 schematically show successive steps in the unloading of a cart and movement of the pallet out of the cart and then back into the cart.

THE SHOPPING CART

With reference to FIGS. 1–3, the shopping cart 11 is formed of a U-shaped body 12 which consists of a bottom 13 and two side walls 14 and is open ended. The body is secured to a framework 16 having wheels 17 and a pivotally mounted pushing handle 18 wherein the body may be wheeled around for shopping purposes. The body is formed of a rigid material such as thin, rigid, metal or plastic so that the U-shaped body remains substantially rigid despite not having end walls. The handle may pivot downwardly to be moved clear of the top part of the cart (see dotted lines in FIG. 1). It is held in its upper (solid line position) by means of a suitable releasible latch 19, such as a springy U-shaped receptacle.

A pallet 20 is provided in the form of flat, rigid, thin, sections which are hinged together. The two end sections 21 form the end walls of the body and the two center sctions 22 form an inner bottom for the body. All of the sections are connected together by suitable hinges 23 and the upper ends of the end sections 21 are provided with cross pins 24 which extend beyond the width of the pallet.

The side walls 14 of the body are notched at 25 for the reception of the pins 24 so that the end sections 21 are suspended vertically due to their pins resting within notches 25, and the sections 22 remain more or less horizontal and spaced a short distance above the bottom of the body particularly at the front end of the basket where the body is sloped downwardly at 26 to form a space between the body bottom 13 and the section 22.

In use, the shopper takes the cart and wheels it about the floor and selects the merchandise that she desires and places it into the cart. Once she has completed her shopping, she wheels the cart to the checkout counter where the checker is waiting.

CHECKOUT COUNTER

The checkout counter 30, schematically shown in FIGS. 4–7 includes an endless, power driven conveyor belt 31 which is supported at its opposite ends by rollers 32 and 33 and a central roller 34. As can be seen the belt is formed with a top, flat deck portion 35 and a sloping feed portion 36. A lower roller or pulley 39 holds the lower lap of the belt in an elevated position. A bagging plate 46 is located above the deck portion and a guide plate 47 is located at the front end of the checkout counter.

The belt is narrower than the space between the side walls of the cart so that the cart may be rolled under the belt with its side walls on either side ol the belt.

*Operation*

Figure 6:
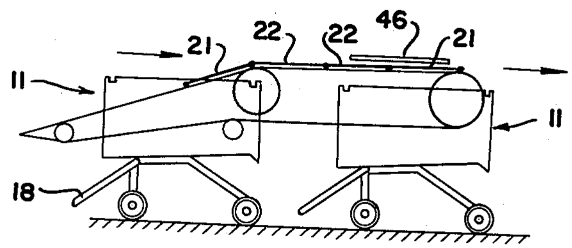
Figure 7:
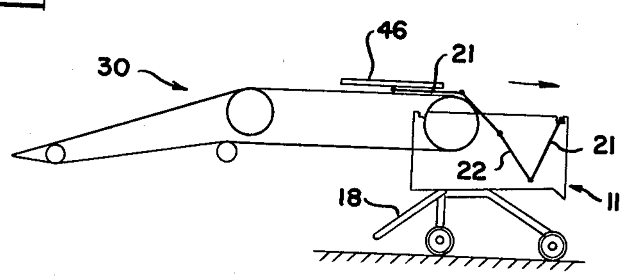

FIGS. 4–7 show successive steps in unloading the cart. As shown in FIG. 4, the shopper moves her loaded cart up to the receiving end of the checkout counter and continues moving it until the guide plate 47 slips into the space between the pallet section 22 and the sloping front end 26 of the cart body. When this happens, the front end section 21 is raised, so that its pins 24 rise above the notches 25 in the body sides, and then it falls forward onto the sloping conveyor belt portion. Further movement of the cart towards the counter plus the action of the moving belt pulls the pallet upwards upon the sloping belt (see FIG. 5) with its merchandise until finally the pallet reaches the deck portion (FIG. 6). As the pallet rises and as it reaches the deck portion, the checkout girl, who stands opposite the flat deck portion of the belt, removes the merchandise from the pallet and places it upon the bagging plate 46. At the same time, she records the cost of the merchandise on a cash register (not shown) which would be next to her. The pallet continues moving until it is unloaded and reaches the end of the conveyor. Here, either the same cart or one of a number of stored carts is waiting, and the pallet is dropped back into the cart (see FIG. 7) where it resumes its normal position.

The merchandise may be placed into bags on top of the bagging plate or may be transferred to a bagging deck, such as an extension of the counter arranged at right angles to the counter (not shown).

Thus, the bagging boy or the person who does the bagging, places the merchandise into bags and then slips the bags into the cart to rest upon the pallet of the cart. At this point, the shopper, having paid her bill, takes the cart and wheels it out of the store to the parking lot and to her car.

This invention may be further developed within the scope of the following attached claims. Accordingly, it is desired that the foregoing description be read as being merely illustrative of an operative embodiment of this invention and not in a strictly limiting sense.

I now claim:

1. A shopping cart comprising a U-shaped body formed of a bottom part and two side walls and being open ended, the body being supported upon wheels for rolling the cart; a pallet consisting of flat sections hinged together end to end to form two opposite end sections between which are located center sections, with the end sections being suspended from the tops of the side walls and forming the ends of the cart body, and the sections between the end section forming an inner bottom, spaced above the cart body bottom part, upon which merchandise may be carried, the pallet being removably mounted in the body.

2. A construction as defined in claim 1, and wherein said end sections are suspended from said side walls by means consisting of upwardly opening notches formed in the tops of the side walls and pins formed at the free ends of the end sections and extending outwardly of the sides of the end sections and being arranged to fit into the notches, whereby the end sections may be lifted vertically upwards to disengage the pins from the notches.

3. A shopping cart comprising a U-shaped body formed of a bottom and two opposite side walls and being open at its opposite ends, the body being supported upon wheels for rolling the cart and one end of the cart being formed as its front end; a merchandise supporting pallet consisting of a bottom portion arranged to fit over the cart body bottom and end walls arranged to form the end walls of the cart body, the pallet being removably mounted within the cart body with the pallet bottom being spaced above the cart bottom at the cart front end, whereby means may be inserted into the space for lifting the pallet out of the cart.

4. A shopping cart comprising a body having a bottom, two spaced apart side walls and open front and rear ends; means supporting the body upon wheels for rolling the cart; a pallet consisting of flat sections, hinged end to end, to form two opposite end sections and at least one center section between the end sections; the end sections being arranged between and transverse to the body side walls and forming front and rear end walls for the body with the center section forming an inner bottom above the bottom of the body and the body side walls, the end sections, and the center section cooperating together to form a complete container within which merchandise may be carried; means for securing the end sections to the respective side walls, said means being releasable upon upward movement of the end sections relative to the side walls, the pallet being removable from the body by raising the respective end sections to release said securing means and lifting the pallet from the body.

5. A construction as defined in claim 4 and wherein the center section is spaced above the body bottom at least at the front end of the body, whereby means may be inserted into such space for lifting the pallet out of the cart body.

6. A shipping cart comprising a body having a bottom, two spaced apart side walls and open front and rear ends, means supporting the body upon wheels for rolling the cart; a merchandise supporting pallet in the form of flat sections hinged together end to end for substantially coplanar arrangement, the pallet having two opposite end sections and at least one center section, the pallet being arranged in the body with its end sections bridging the space between the body side walls and the front and rear of the body respectively and releasably secured to the body side walls, with the center section arranged above the body bottom and with the side walls, end sections, and center section forming a container within which merchandise may be carried with the merchandise rested upon the center section, and the pallet being removable from the body with its end sections being foldable into the plane of the center section for thus removing the merchandise rested upon the center section.

References Cited in the file of this patent

UNITED STATES PATENTS 2,450,051 Manning ---------------- Sept. 28, 1948